United States Patent
Vartakavi et al.

(10) Patent No.: US 12,198,353 B2
(45) Date of Patent: *Jan. 14, 2025

(54) METHODS AND SYSTEMS FOR AUTOMATICALLY GENERATING BACKDROP IMAGERY FOR A GRAPHICAL USER INTERFACE

(71) Applicant: Gracenote, Inc., New York, NY (US)

(72) Inventors: Aneesh Vartakavi, Emeryville, CA (US); Jeffrey Scott, Emeryville, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,485

(22) Filed: Jan. 18, 2024

(65) Prior Publication Data

US 2024/0153097 A1    May 9, 2024

Related U.S. Application Data

(63) Continuation of application No. 17/462,375, filed on Aug. 31, 2021, now Pat. No. 11,915,429.

(51) Int. Cl.
*G06T 7/13* (2017.01)
*G06T 3/403* (2024.01)
(Continued)

(52) U.S. Cl.
CPC ........... *G06T 7/13* (2017.01); *G06T 3/403* (2013.01); *G06T 7/149* (2017.01); *G06V 10/25* (2022.01)

(58) Field of Classification Search
CPC .......... G06T 7/13; G06T 3/403; G06T 7/149; G06T 2207/20132; G06T 7/11;
(Continued)

(56) References Cited

U.S. PATENT DOCUMENTS 5,574,799 A * 11/1996 Bankman ............... G06V 10/40
382/190
8,442,384 B2    5/2013 Bronstein
(Continued)

FOREIGN PATENT DOCUMENTS

CN    107750460 B    11/2020
CN    113010711 B    4/2022
(Continued)

OTHER PUBLICATIONS

Bradley, "Automated Generation of Intelligent Video Previews on Cloudinary's Dynamic Video Platform", Apr. 13, 2020.
(Continued)

*Primary Examiner* — Charles T Shedrick
(74) *Attorney, Agent, or Firm* — McDonnell Boehnen Hulbert & Berghoff LLP

(57) ABSTRACT

In one aspect, an example method for generating a candidate image for use as backdrop imagery for a graphical user interface is disclosed. The method includes receiving a raw image and determining an edge image from the raw image using edge detection. The method also includes identifying a candidate region of interest (ROI) in the raw image based on the candidate ROI enclosing a portion of the edge image having edge densities exceeding a threshold edge density. The method also includes manipulating the raw image relative to a backdrop imagery canvas for a graphical user interface based on a location of the candidate ROI within the raw image. The method also includes generating, based on the manipulating, a set of candidate backdrop images in which at least a portion of the candidate ROI occupies a preselected area of the backdrop imagery canvas, and storing the set of candidate backdrop images.

20 Claims, 13 Drawing Sheets

(51) Int. Cl.
*G06T 7/149* (2017.01)
*G06V 10/25* (2022.01)

(58) Field of Classification Search
CPC ...... G06V 10/25; G06V 10/945; G06V 10/44; G06V 40/161; G06F 3/0481
See application file for complete search history.

(56) References Cited

U.S. PATENT DOCUMENTS

| | | | |
|---|---|---|---|
| 9,271,035 B2 | 2/2016 | Mei | |
| 9,502,073 B2 | 11/2016 | Boiman | |
| 9,514,536 B2 | 12/2016 | Rafati | |
| 9,594,984 B2 | 3/2017 | Yu | |
| 10,107,594 B1* | 10/2018 | Li | G06T 5/50 |
| 10,657,730 B2 | 5/2020 | Fyke | |
| 10,762,608 B2 | 9/2020 | Shen | |
| 11,062,127 B2 | 7/2021 | Scott | |
| 11,145,065 B2 | 10/2021 | Vartakavi | |
| 2003/0139840 A1* | 7/2003 | Magee | G06Q 30/06 700/133 |
| 2003/0198368 A1 | 10/2003 | Kee | |
| 2006/0064716 A1 | 3/2006 | Sull | |
| 2008/0273766 A1 | 11/2008 | Kim | |
| 2009/0209857 A1* | 8/2009 | Secretain | A61B 8/0833 600/437 |
| 2012/0106806 A1 | 5/2012 | Folta | |
| 2012/0254791 A1 | 10/2012 | Jackson | |
| 2013/0027532 A1* | 1/2013 | Hirota | G06T 7/0012 348/E7.085 |
| 2013/0259332 A1 | 10/2013 | McVey | |
| 2014/0099034 A1 | 4/2014 | Rafati | |
| 2014/0270431 A1 | 9/2014 | Xu | |
| 2016/0104055 A1 | 4/2016 | Lin | |
| 2016/0379090 A1 | 12/2016 | Shah | |
| 2017/0039457 A1 | 2/2017 | Yu | |
| 2017/0154237 A1* | 6/2017 | Shen | G06V 20/00 |
| 2017/0330029 A1 | 11/2017 | Turcot | |
| 2018/0005026 A1* | 1/2018 | Shaburov | A63F 13/52 |
| 2018/0012110 A1 | 1/2018 | Souche | |
| 2018/0121762 A1 | 5/2018 | Han | |
| 2019/0073520 A1 | 3/2019 | Ayyar | |
| 2019/0130232 A1 | 5/2019 | Kaasila | |
| 2020/0104594 A1 | 4/2020 | Zucker | |
| 2021/0097263 A1 | 4/2021 | Scott | |
| 2021/0225005 A1 | 7/2021 | Vartakavi | |
| 2021/0374391 A1* | 12/2021 | Jorasch | G06V 40/10 |
| 2021/0399911 A1* | 12/2021 | Jorasch | H04L 12/1822 |
| 2021/0400142 A1* | 12/2021 | Jorasch | H04N 21/4781 |

FOREIGN PATENT DOCUMENTS

| | | | | |
|---|---|---|---|---|
| FR | 2680931 A1 * | 3/1993 | | G01S 3/7865 |
| FR | 2680931 B1 | 8/1997 | | |
| KR | 20170082025 A | 7/2017 | | |
| KR | 20180079894 A | 7/2018 | | |
| KR | 20180130925 A | 12/2018 | | |
| WO | 2016205432 A1 | 12/2016 | | |
| WO | 2017155660 A1 | 9/2017 | | |
| WO | 2017201540 A1 | 11/2017 | | |

OTHER PUBLICATIONS

China National Intellectual Proeprty Administration, (English Translation), Search Report mailed on Sep. 30, 2022, issued in connection with Chinese Application No. 202080067828.2, filed on Sep. 18, 2020.

China National Intellectual Proeprty Administration, First Office Action mailed on Nov. 15, 2022, issued in connection with Chinese Patent App. No. 202080067828.2, 6 pages (English Translation).

International Searching Authority, International Search Report and Written Opinion mailed on Feb. 15, 2021, issued in connection with International Patent Application No. for PCT/US2020/057303 filed Oct. 26, 2020, 14 pages.

International Searching Authority, International Search Report and Written Opinion mailed on Jan. 29, 2021, issued in connection with International Patent Application No. for PCT/US2020/057322 filed Oct. 26, 2020, 8 pages.

International Searching Authority, International Search Report and Written Opinion mailed on Dec. 30, 2020, issued in connection with International Patent Application No. for PCT/US2020/051414 filed Sep. 18, 2020, 7 pages.

* cited by examiner

METHODS AND SYSTEMS FOR AUTOMATICALLY GENERATING BACKDROP IMAGERY FOR A GRAPHICAL USER INTERFACE

CROSS-REFERENCE TO RELATED APPLICATIONS

This application is a continuation of and claims priority to U.S. patent application Ser. No. 17/462,375, filed Aug. 31, 2021, which is incorporated herein by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

In this disclosure, the term "computing system" means a system that includes at least one computing device. In some instances, a computing system can include one or more other computing systems.

SUMMARY

In one aspect, an example method for generating a candidate image for use as backdrop imagery for a graphical user interface is disclosed. The method includes receiving, by a computing system, a raw image. The method also includes determining, by the computing system, an edge image from the raw image using edge detection. The method also includes identifying, by the computing system, a candidate region of interest (ROI) in the raw image based on the candidate ROI enclosing a portion of the edge image having edge densities that exceed a threshold edge density. The method also includes manipulating, by the computing system, the raw image relative to a backdrop imagery canvas for a graphical user interface based on a location of the candidate ROI within the raw image. The method also includes generating, by the computing system and based on the manipulating, a set of candidate backdrop images in which at least a portion of the candidate ROI occupies a preselected area of the backdrop imagery canvas. The method also includes storing, by the computing system, in non-transitory computer-readable memory, the set of candidate backdrop images.

In another aspect, an example non-transitory computer-readable medium is disclosed. The non-transitory computer-readable medium has stored thereon program instructions that upon execution by a processor, cause performance of a set of operations including receiving a raw image, determining an edge image from the raw image using edge detection, identifying a candidate region of interest (ROI) in the raw image based on the candidate ROI enclosing a portion of the edge image having edge densities that exceed a threshold edge density, manipulating the raw image relative to a backdrop imagery canvas for a graphical user interface based on a location of the candidate ROI within the raw image, generating, based on the manipulating, a set of candidate backdrop images in which at least a portion of the candidate ROI occupies a preselected area of the backdrop imagery canvas, and storing, in non-transitory computer-readable memory, the set of candidate backdrop images.

In another aspect, an example computing system is disclosed. The computing system includes a processor and a non-transitory computer-readable storage medium, having stored thereon program instructions that, upon execution by the processor, cause performance of a set of operations including receiving a raw image, determining an edge image from the raw image using edge detection, identifying a candidate region of interest (ROI) in the raw image based on the candidate ROI enclosing a portion of the edge image having edge densities that exceed a threshold edge density, manipulating the raw image relative to a backdrop imagery canvas for a graphical user interface based on a location of the candidate ROI within the raw image, generating, based on the manipulating, a set of candidate backdrop images in which at least a portion of the candidate ROI occupies a preselected area of the backdrop imagery canvas, and storing, in non-transitory computer-readable memory, the set of candidate backdrop images.

DETAILED DESCRIPTION

I. Overview

Figure 1:
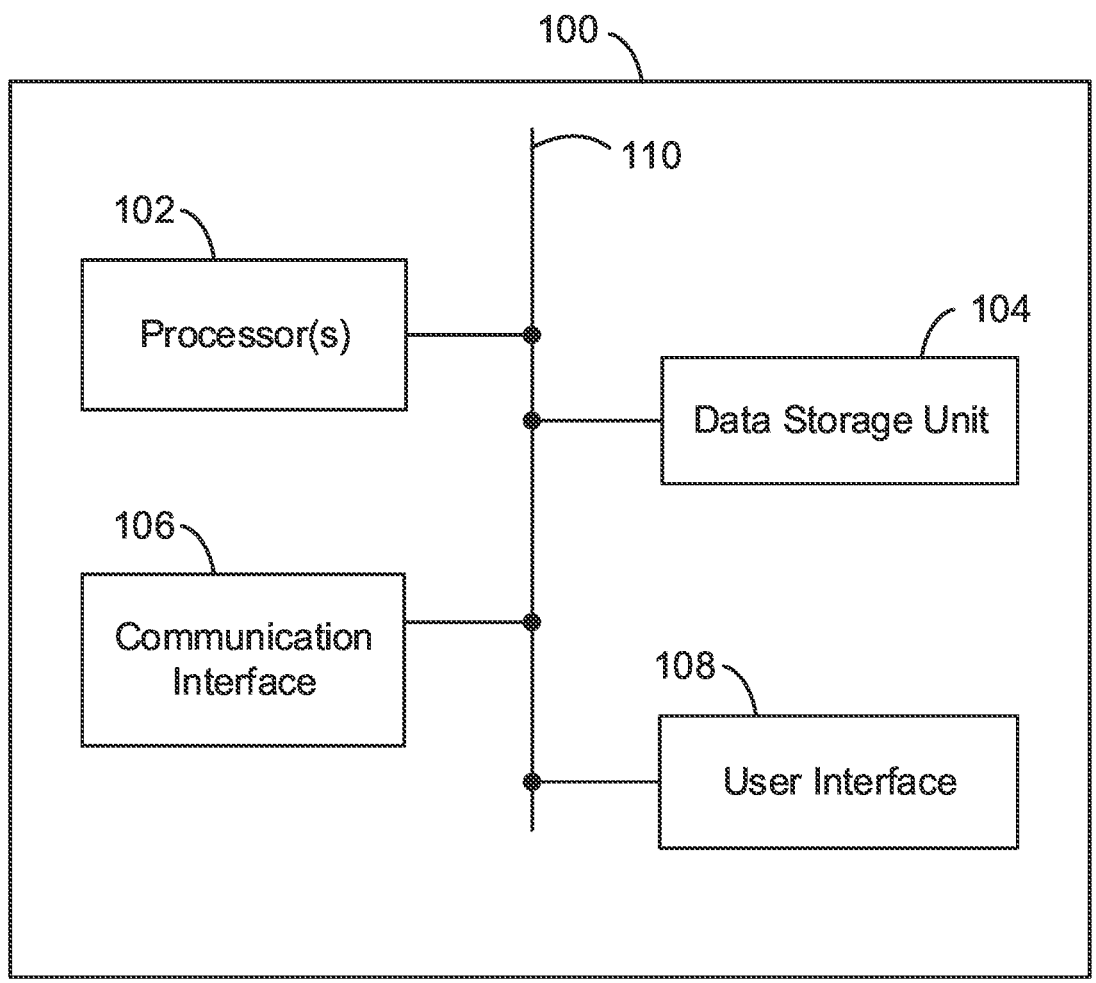
FIG. 1 is a simplified block diagram of an example computing device.

Graphical user interfaces, such as those found in software applications associated with broadcasters or streaming media services, often include backdrop imagery to help end users (e.g., subscribers to a broadcaster's content or a streaming media service) identify media content or to otherwise provide an aesthetically-pleasing user experience. As an example, when an end user views a menu on a software application for a streaming media service, the menu can include a backdrop image for a particular television program, and text describing the television program (e.g., a title, plot summary, user rating) can be overlaid over at least a portion of the backdrop image. In some cases, the focus of the backdrop image might be located at a particular region of the screen, such as a region in which little to no text appears, such as for the purpose of drawing an end user's attention to that region.

Conventionally, creation and review of backdrop images can be largely (or entirely) a manual process performed by one or more humans (e.g., a team of editors) who apply artistic and aesthetic judgement at least some of the stages of the process. As an example of this process, a "raw image" (i.e., an initial image) is taken and one or more versions of the raw image (referred to herein as "candidates" or "candidate backdrop images") are generated. From a given raw image, at least one candidate backdrop image can be created, each having a respective set of characteristics (e.g., a desired focal point, cropping border, image size, and aspect ratio). For example, a single raw image can be used to generate multiple candidate backdrop images, each having a different desired focal point. Herein, the desired focal point of a raw image is also referred to as a region of interest (ROI) of the raw image.

In addition to identifying a ROI, creation of a candidate backdrop image can involve manipulating the raw image (e.g., scaling, shifting, etc.) in various ways so that the ROI will appear at a desired location in a backdrop imagery canvas, and then filling a remaining blank region of the backdrop imagery canvas in a way that is aesthetically pleasing, such as by applying a blur effect to the edges of the image. Herein, a "backdrop imagery canvas" refers to a digital canvas that defines a spatial representation of a backdrop image, and possibly one or more additional graphical elements (e.g., text or other images), in a graphical user interface, such as a graphical user interface of a software application that can be executed on a television, smartphone, laptop computer, or other computing device. Once various candidate backdrop images have been generated, a human or humans typically review the candidate backdrop images.

The above-described process is typically time consuming, costly, and complex, particularly for a content provider that is generating and reviewing large volumes (e.g., hundreds or thousands) of candidate backdrop images.

Accordingly, disclosed herein are methods and systems for automatically generating candidate backdrop imagery. In an example method, a computing system can take a raw image and use one or more edge detection techniques to generate an edge image from the raw image. The computing system can then identify a candidate ROI in the raw image based on the candidate ROI enclosing a portion of the edge image having edge densities that exceed a threshold edge density. Other techniques can be used to identify candidate ROIs in raw images as well, additionally or alternatively to edge detection.

Having identified a candidate ROI, the computing system can manipulate the raw image in one or more ways relative to a backdrop imagery canvas based on a location of the candidate ROI within the raw image, such as in a way that lines up a vertical centerline of the backdrop imagery canvas with left edge of the candidate ROI. Based on the manipulation, the computing system can then generate and store a set of candidate backdrop images in which at least a portion of the candidate ROI occupies, in each candidate backdrop image of the set, a preselected area of the backdrop imagery canvas.

In some examples, the computing system might also display the set of candidate backdrop images to an editor for the editor to select a particular candidate, or might alternatively select one of the candidates without input from an editor. Additionally, the computing system can send the selected candidate to another computing system (e.g., a server associated with a content delivery service, such as a streaming service) for the other computing system to integrate into a graphical user interface of a software application.

Various other features of the example method discussed above, as well as other methods and systems, are described hereinafter with reference to the accompanying figures.

II. Example Computing System

A. Computing Device

FIG. 1 is a simplified block diagram of an example computing device 100. Computing device 100 can perform various operations, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more operations, such as those described in this disclosure. As such, computing device 100 can be configured to perform one or more operations, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

B. Computing System

Figure 2:
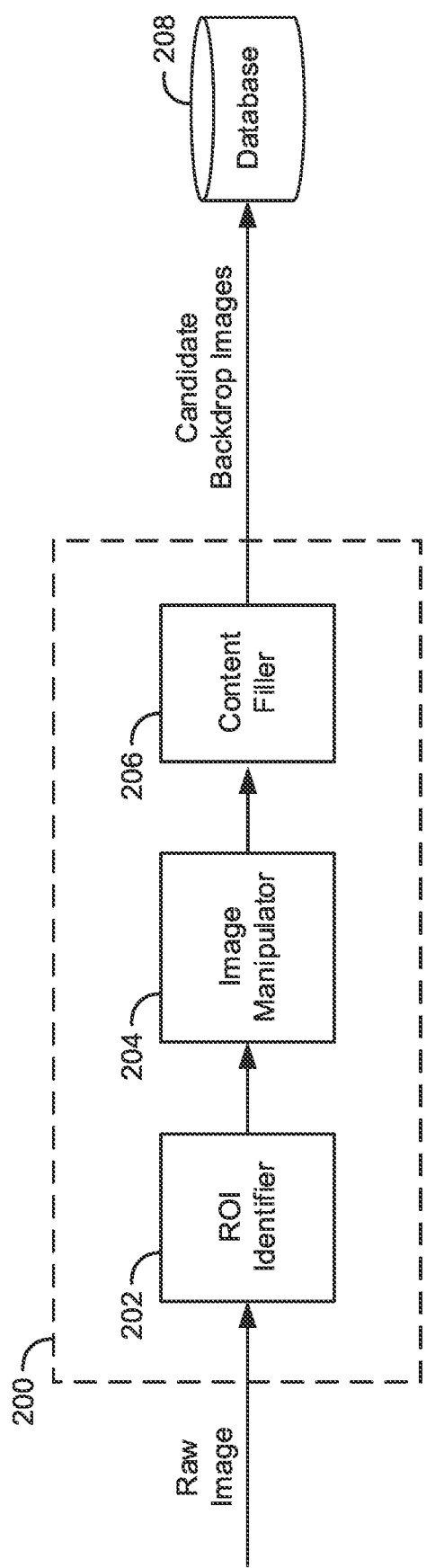
FIG. 2 is a simplified block diagram of an example computing system in which various described principles can be implemented.

FIG. 2 is a simplified block diagram of an example computing system 200. Computing system 200 can perform various operations related to generating a candidate image for use as backdrop imagery for a graphical user interface.

As shown in FIG. 2, computing system 200 can include various components, such as ROI identifier 202, image manipulator 204, and content filler 206. Each of the ROI identifier 202, the image manipulator 204, and the content filler 206 can be implemented as a computing system. For instance, one or more of the components depicted in FIG. 2 can be implemented using hardware (e.g., a processor of a machine, a field-programmable gate array (FPGA), or an application-specific integrated circuit (ASIC), or a combination of hardware and software. Moreover, any two or more of the components depicted in FIG. 2 can be combined into a single component, and the function described herein for a single component can be subdivided among multiple components.

Also shown is a database 208 (e.g., data storage unit 104), which can be a component singular to or distributed across one or more components of the computing system 200. Alternatively, the database 208 can be a component of a separate computing system, different from computing system 200. Various forms of data described herein can be stored in the database 208, including but not limited to raw images and/or candidate backdrop images.

In some configurations, the computing system 200 can be configured as a server and/or a client (or perhaps a cluster of servers and/or a cluster of clients) operating in one or more server-client type arrangements, for instance. In some examples, the computing system 200 can be, or can be included as part of, a computing system such as a content provider system that provides backdrop imagery to computing systems associated with content delivery services such as broadcasters or streaming media services.

The ROI identifier 202 can be configured to receive a raw image and detect/identify a candidate ROI in the raw image. The raw image can be a digital image, such as a screenshot from a television program, advertisement, film, or other type of content.

To facilitate this, the ROI identifier 202 can use various techniques. As an example, the ROI identifier 202 can perform pre-processing on the raw image, such as pre-smoothing the raw image to reduce detail. The ROI identifier 202 can then use a Canny edge detector or other edge detection algorithms to generate an edge image from the raw image.

Within examples, the edge image can be a version of the raw image in which at least a portion of edges (e.g., boundaries of objects) that appear in the raw image are represented. For instance, the edge image can be a binary edge image in which each pixel of the binary edge image is stored as a single bit (i.e., a 0 or 1), particularly where edges are stored as 1s and the remaining portions of the raw image are stored as 0s. In some black and white binary edge images, the 1s can appear as white pixels, and non-edges can appear as black pixels, whereas in other black and white binary edge images, the is can appear as black pixels, and the non-edges can appear as white pixels.

Having generated the edge image, the ROI identifier 202 can perform post-processing (e.g., filtering/thresholding) on the edge image and identify the ROI based on the post-processing. In some configurations, the ROI identifier 202 can identify the ROI without performing post-processing. Herein, a candidate ROI is primarily described and illustrated as being designated with a rectangular bounding box. The bounding box representing the candidate ROI can be defined by a set of coordinates that identify the ROI's spatial location in both the edge image and the corresponding raw image.

As another example, the ROI identifier 202 can use one or more face detection techniques now known or later developed to identify the ROI. This can be useful, for instance, because when a raw image depicts one or more people, at least one of the one or more people are likely to be part of the focal point of the raw image (e.g., the main character of a film).

As yet another example, the ROI identifier 202 can include a machine learning ROI predictor program implemented on the ROI identifier 202. For instance, such as machine learning predictor program can include artificial neural networks (ANNs) that function to extract features from a raw image, predict ROI characteristics of a ROI (e.g., a bounding box of an ROI) for the raw image based on expected ROI characteristics represented in a set of training raw images, and predict confidence levels of the predicted ROI characteristics. As a more specific example, the ROI identifier 202 can use a machine learning predictor program similar to the machine learning predictor program described in U.S. patent application Ser. No. 16/749,724, filed Jan. 22, 2020, which is hereby incorporated herein by reference. In particular, the machine learning predictor program of U.S. patent application Ser. No. 16/749,724 is configured to generate predicted cropping characteristics, such as cropping boundaries, image sizes (e.g., pixel-array size), and/or ROIs, for any given input image, and could be used with respect to the raw image to identify ROI characteristics of a ROI as discussed above.

The image manipulator 204 is configured to receive, from the ROI identifier 202, data representing the candidate ROI and manipulate the raw image relative to a backdrop imagery canvas for a graphical user interface based on a location of the candidate ROI within the raw image. In some situations, if the ROI identifier 202 or the image manipulator 204 determines that the raw image and/or the candidate ROI meets certain predefined conditions, the raw image might not be manipulated prior to being used in a candidate backdrop image. For example, if the image manipulator 204 and/or another component of the computing system 200 determines that (i) the raw image and the backdrop imagery canvas have the same aspect ratio and that (ii) before any manipulation of the raw image occurs, the candidate ROI is located in a preselected area of the backdrop imagery canvas (e.g., a preselected area indicative of a desired location for a ROI in a backdrop image for the GUI), the computing system 200 might not manipulate the raw image and will use the raw image as a candidate backdrop image.

The image manipulator 204 can be configured to manipulate the raw image in various ways, such as by using various shifting, scaling, and/or cropping techniques. Examples of such techniques are described in more detail below. By manipulating the raw image in various ways, the image manipulator 204 can generate a set of candidate backdrop images in which at least a portion of the candidate ROI occupies a preselected area of the backdrop imagery canvas.

In some cases, manipulating the raw image relative to the backdrop imagery canvas can create a portion of the backdrop imagery canvas that is not filled (i.e., not occupied with any portion of the raw image). In such cases, it may be desirable for artistic or aesthetic reasons to fill the remaining, un-filled portion of the backdrop imagery canvas.

Accordingly, the content filler 206 can be configured to fill the remaining portion of the backdrop imagery canvas using various techniques now known or later developed. For example, the content filler 206 can sample the dominant color from one or more different regions of the raw image and fill the remaining portion with a solid color that matches or is a shade of the sampled dominant color(s). As another example, the content filler 206 can use a digital image inpainting technique, such as an inpainting approximation technique that reflects, stretches, and blurs a border portion of the raw image to fill the remaining portion of the backdrop image canvas. Other examples are possible as well.

Each of the ROI identifier 202, the image manipulator 204, and the content filler 206 can be configured to store candidate backdrop images or other data (e.g., edge images, ROI coordinates, etc.) in the database 208.

III. Example Operations

Computing system 200 and/or components thereof can be configured to perform one or more operations. Examples of these operations and related features will now be described.

The computing system 200 described in connection with these operations can be a computing system of a content provider that supplies content (e.g., candidate backdrop imagery itself, or content that includes candidate backdrop imagery) to a delivery service, such as a broadcaster or streaming service. In some cases, the computing system 200 can be a computing system of a broadcaster or streaming service. Other examples are possible as well.

A. Operations Related to Generating Candidate Backdrop Imagery for a Graphical User Interface The computing system 200 can receive a raw image. The raw image can be a frame from media content (e.g., a television program or movie), a promotional image for the media content, or other image associated with the media content, for example. From the raw image, the computing system 200 can generate at least one candidate backdrop image that includes at least a portion of the raw image and includes at least a portion of a ROI of the raw image in a preselected area.

As discussed above, a candidate backdrop image can be used as a backdrop image for a graphical user interface. The operations described herein primarily relate to an example in which the desired location for a ROI is a right side of a graphical user interface, or more particularly, a top right region of the graphical user interface. It should be understood, however, that the operations described herein can be used to locate the ROI in other regions of a graphical user interface, since different types of graphical user interfaces might require the ROI of a raw image to be located elsewhere.

Figure 3:
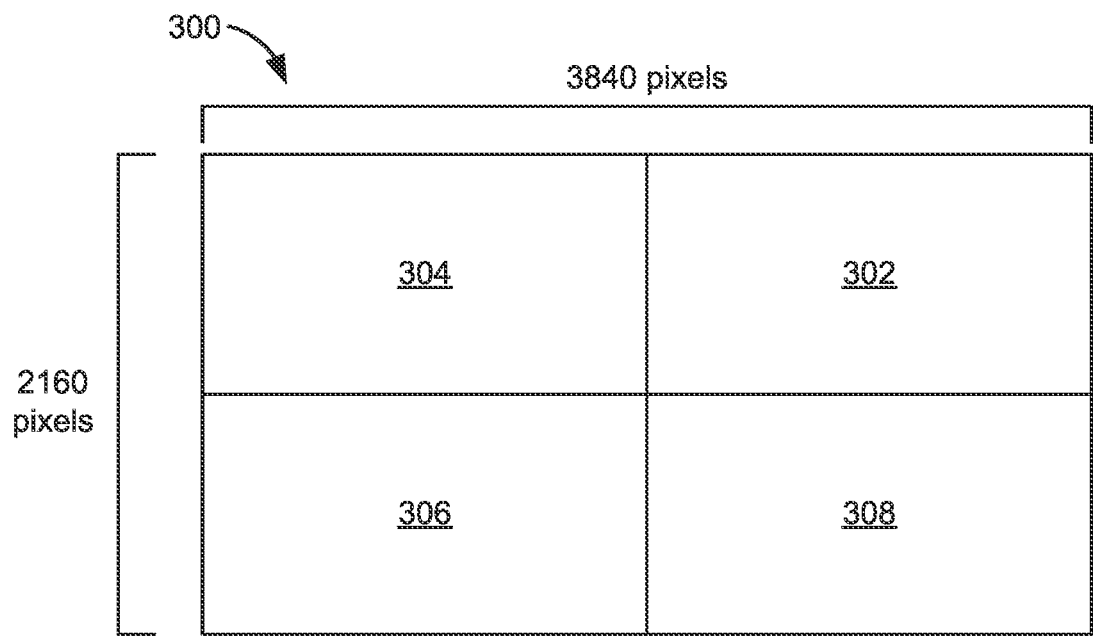
FIG. 3 depicts an example template for a backdrop image for a graphical user interface.

FIG. 3 depicts an example template 300 for a graphical user interface. In particular, the template 300 shown in FIG. 3 has a size of 3840×2160 pixels and is divided into four example regions, each having a size of 1920×1080 pixels. Because the graphical user interface has a size of 3840×2160 pixels, the backdrop imagery canvas used to generate a backdrop image for the graphical user interface can be 1920×1080 pixels as well.

Region 302 of the template 300 is a region that can includes at least a portion of a candidate ROI of a raw image associated with media content. To the left of region 302 is region 304, which can include a title treatment for the media content. Region 306 is located at the bottom left of the template 300 and can include a text description related to the media content (e.g., a summary of the media content). Lastly, region 308 is located at the bottom right of the template and can include other elements related to the media content. For example, if the backdrop image is part of a streaming service and the media content is a television program, the bottom right can include graphical elements representing episodes of the television program, or graphical elements representing other television programs.

Other example templates are possible as well, such as those including more or less regions, or those in which the ROI is designated to a different region other than region 302 in the top right of the template 300. For instance, in some examples, region 304 can include a title treatment for the media content as well as text description of a television program, and region 306 and region 308 can both include graphical elements representing episodes of the television program.

Figure 4:
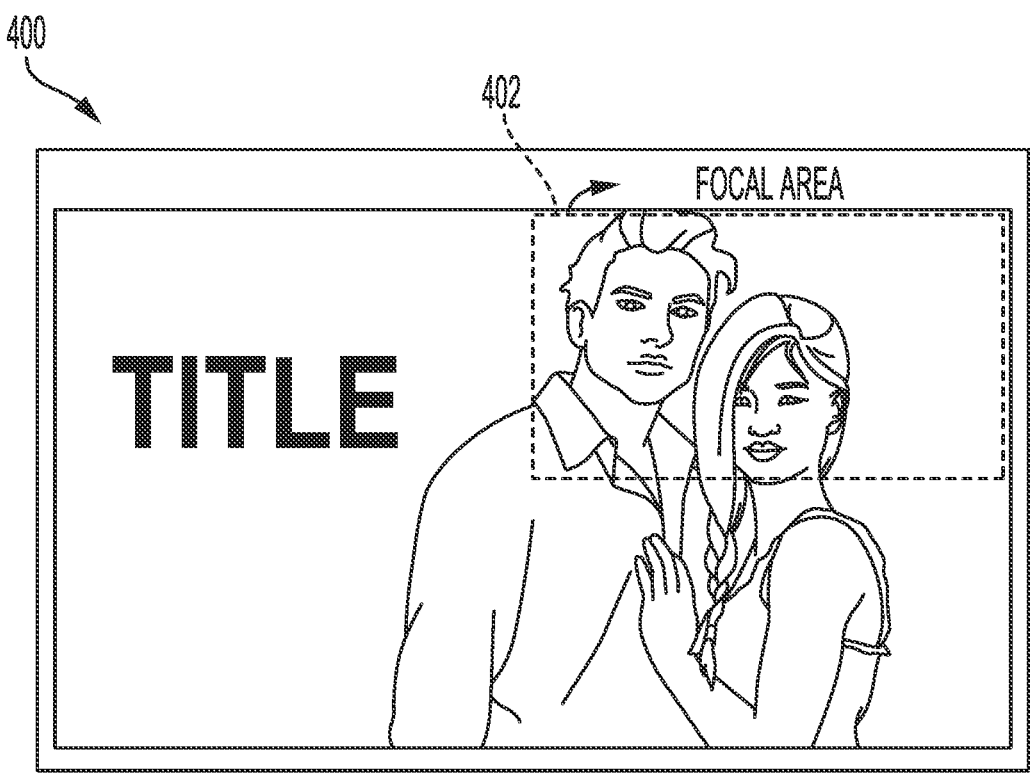
FIG. 4 depicts an example backdrop image.

FIG. 4 depicts an example backdrop image 400 that has the same size (i.e., 3840 by 2160 pixels) as the template 300. As shown, the faces of the two people in the backdrop image 400 are located in the top right region, which is a ROI 402 corresponding to region 302 of the template 300 of FIG. 3.

From a raw image, the computing system 200 can identify a ROI. In some examples, the computing system 200 can use various techniques to identify multiple different ROIs (also referred to herein as "candidate ROIs"), each having a unique bounding box. From each ROI, at least one candidate backdrop image can be generated. In some cases, multiple ROIs can be identified using the same technique.

As indicated above, one technique that the computing system 200 can use to identify a ROI is edge detection, such as Canny edge detection. In some images, a focal point of the image might include details that result in a high density of edges. Thus, edge detection can be a reliable technique for autonomously identifying a ROI.

Accordingly, the computing system 200 can determine an edge image from the raw image using edge detection and then identify a candidate ROI in the raw image based on the candidate ROI enclosing a portion of the edge image having edge densities that exceed a threshold edge density.

In some examples, the computing system 200 can pre-smooth the raw image before determining the edge image and before identifying the candidate ROI. As an example, the computing system 200 can use a bilateral filter to smooth the raw image by taking at least a portion of the pixels in the raw image and, for each pixel, replacing the intensity of the pixel with a weighted average of intensities from nearby pixels (e.g., connected pixels, or pixels within a threshold distance from pixel, such as three pixels).

Smoothing the raw image using a bilateral filter or other smoothing technique now known or later developed can advantageously help retain important edges in the edge image that is generated, while helping discard noisy edges that are likely to be irrelevant for the post-processing operations described in more detail below. Phrased another way, pre-smoothing the raw image can increase the reliability of the computing system 200 in identifying a candidate ROI in the raw image. It should be understood, however, that with some raw images, a candidate ROI can be reliably identified without pre-smoothing the raw image, such as for raw images that do not include much detail in the background.

Figure 5:
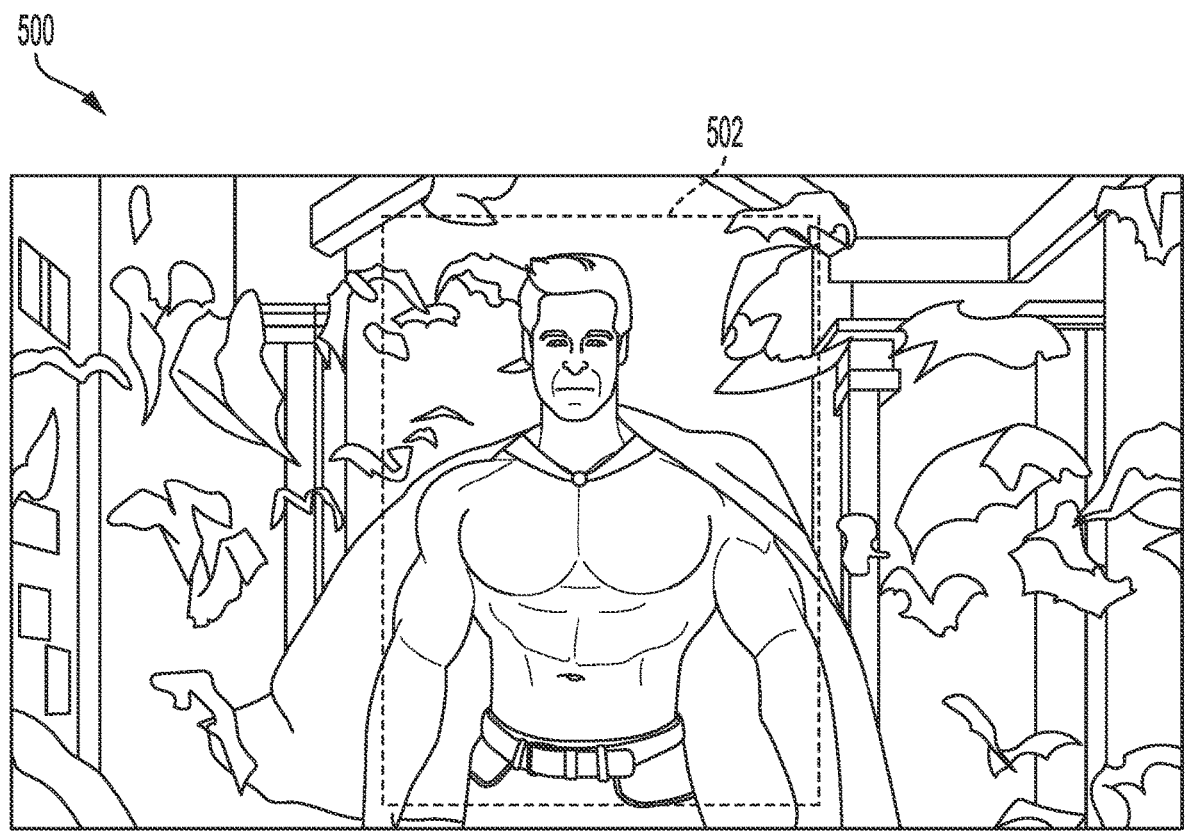
FIG. 5 depicts an example raw image and region of interest.

FIG. 5 depicts an example raw image 500 and candidate ROI 502 that can be identified in the raw image 500 using the operations described herein. FIGS. 6, 7, 8, and 9 then depict representative examples of how the computing system 200 can identify the candidate ROI 502.

Figure 6:
FIG. 6 depicts an example edge image.

FIG. 6 depicts a first edge image 600 that can be generated from the raw image 500 of FIG. 5 without pre-smoothing the raw image 500 beforehand.

Figure 7:
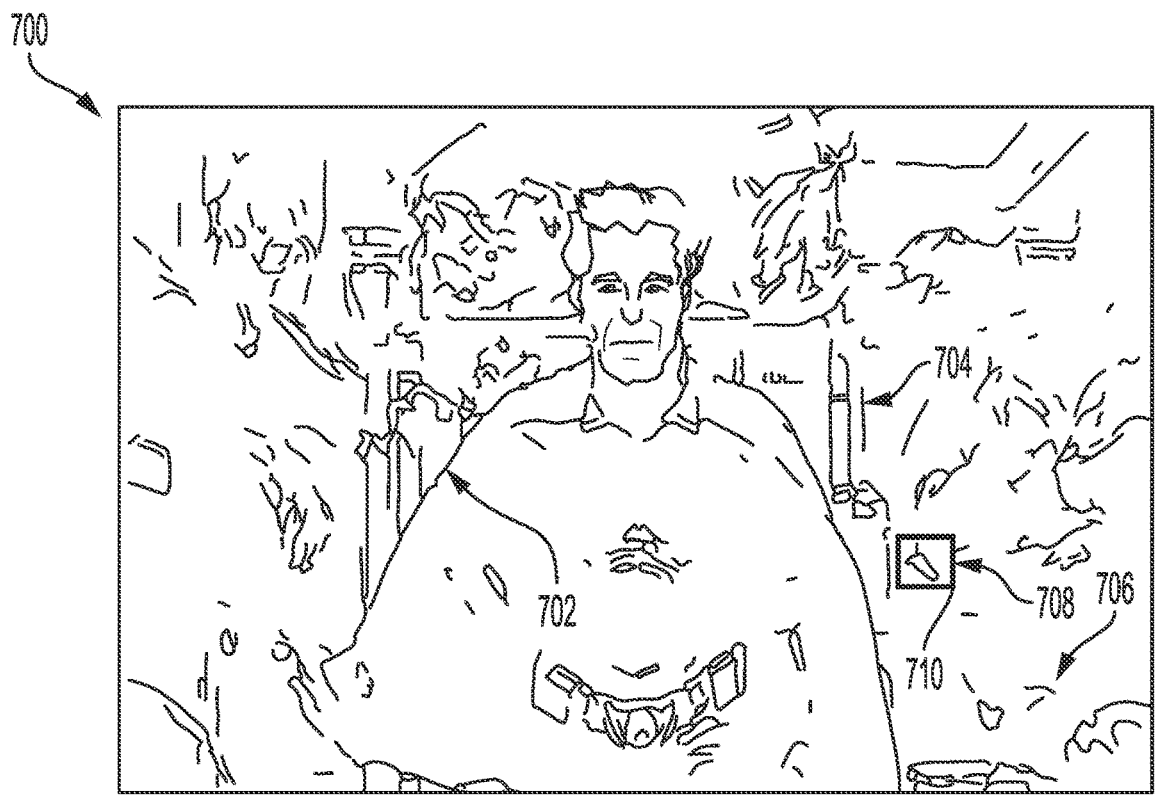
FIG. 7 depicts an example edge image.

FIG. 7 next depicts a second edge image 700 that can be generated from the raw image 500 of FIG. 5 after pre-smoothing the raw image 500.

As shown, the intensity of some of the edges in the second edge image 700 are less than in the first edge image 600. In addition, some edges present in the first edge image 600 are not present in the second edge image 700.

Having determined the edge image (e.g., the first edge image 600 or the second edge image 700), the computing system 200 can perform various filtering techniques on the edge image before identifying the candidate ROI. In particular, the computing system 200 can remove, from the edge image, contours that satisfy a set of conditions. Herein, a "contour" can be a plurality of connected pixels that each have a binary value of 1, and can also be a single pixel that has a binary value of 1 and that is not connected to any other pixels. Further, in this context, "connected" refers to a pixel having at least one edge and/or at least one corner that is connected to at least one edge and/or at least one corner of another pixel. As such, connected pixels can be lines, curves, or can take other shapes.

The second edge image 700 of FIG. 7, for instance, includes numerous contours, of which contour 702, contour 704, contour 706, and contour 708 are denoted as representative examples.

The set of conditions can include a condition that a contour comprises a straight line of pixels that is below a threshold length of pixels, for example. In this context, a straight line of pixels can be a horizontal, vertical, or diagonal sequence of pixels, each having a binary value of 1, in a straight line having a thickness of one pixel (e.g., a horizontal line having a height of one pixel, or a vertical line having a width of one pixel) and surrounded by pixels having a binary value of 0. As such, certain vertical, horizontal, and diagonal lines, such as shorter lines that fall below the threshold length, can be removed from the edge image. The threshold length of pixels can be selected from a range of 25 to 45 pixels, for instance, such as a threshold of 35 pixels. Other example threshold lengths are possible as well.

As another example, the set of conditions can include a condition that a contour has an area that is below a threshold area. In some examples, the area of a contour can be or include a total number of pixels that make up the contour. In other examples, the area of a contour can be or include an area enclosed by a closed contour, where a closed contour is a continuous closed loop of connected pixels, and the area enclosed by the closed contour is a total number of pixels, including pixels having values of 0 and pixels having values of 1, enclosed by the closed contour. In situations in which a contour includes only a single pixel, the contour has an area of 1. In some cases, the threshold area can be a percentile of the areas of the contours of the edge image. For instance, a contour can be removed if its area is below a 90th percentile of the areas of the contours of the edge image.

As yet another example, the set of conditions can include a condition that a contour comprises a perimeter that is below a threshold perimeter (e.g., 100 pixels). In some examples, the perimeter of a contour can be or include a plurality of connected pixels that form an outermost border of the contour. In alternative examples, the perimeter of a contour can be or include a plurality of connected pixels that form an innermost border of the contour. In situations in which a contour includes only a single pixel, the contour has a perimeter of 1. In some cases, the threshold perimeter can be a percentile of the perimeters of the contours of the edge image. For instance, a contour can be removed if its perimeter is below a 90th percentile of the perimeters of the contours of the edge image.

Figure 8:
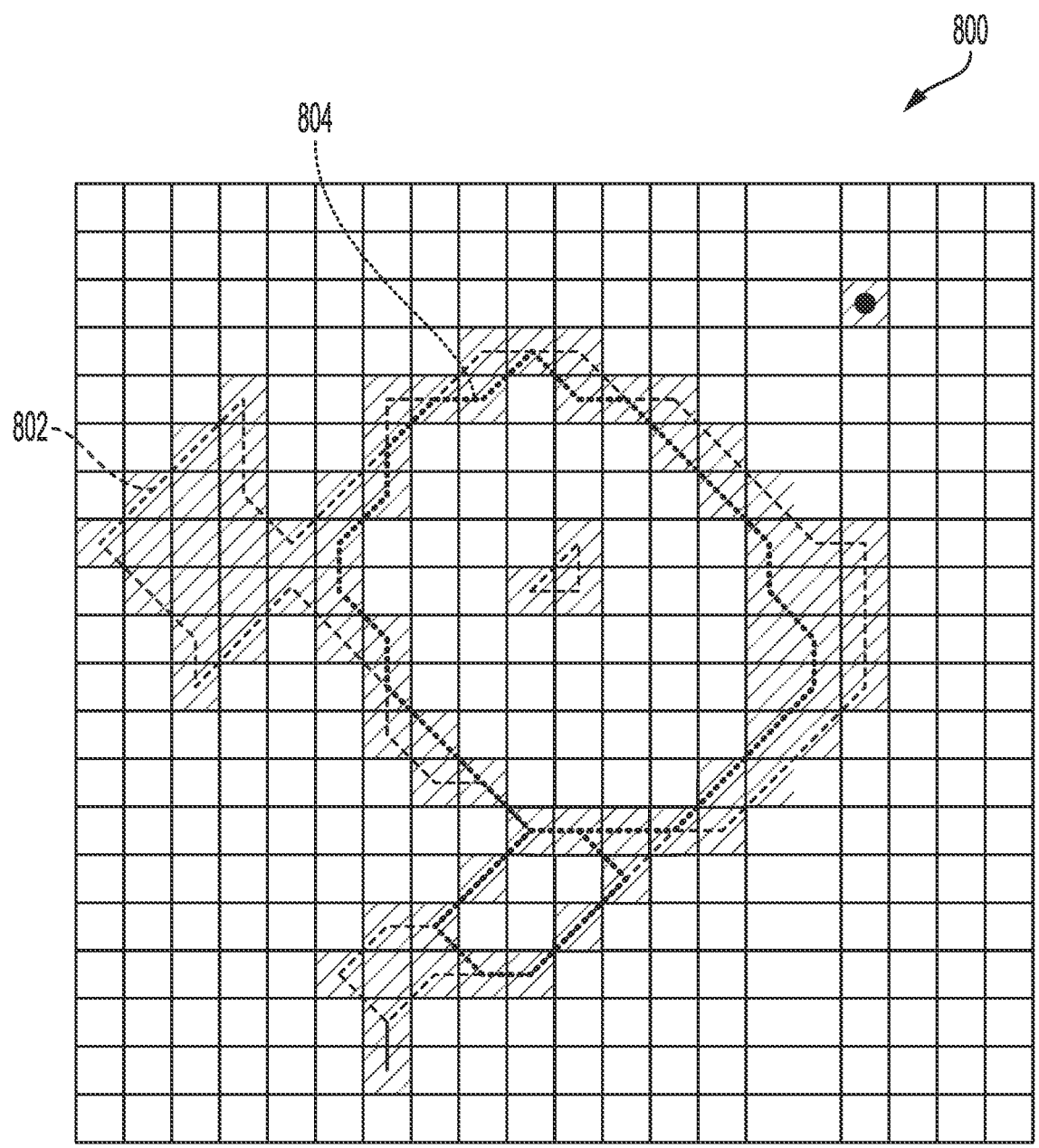
FIG. 8 depicts an example contour.

As an illustrative example, FIG. 8 depicts a contour 800 having an outer contour 802 designated with a dashed line and an inner contour 804 designated with a dotted line.

In some implementations, when identifying contours, the computing system 200 can draw bounding boxes around each contour. As a representative example, contour 708 is designated with a bounding box 710. The contour's bounding box can be used to determine one or more features of the contour, such as the shape of the contour or an aspect ratio of the contour. For example, the aspect ratio of the contour is equal to the width of the bounding box divided by the height of the bounding box.

Other features of a contour can be used for filtering as well. For example, the set of conditions can include a condition that a contour has an aspect ratio that falls within a preselected aspect ratio range, such as a aspect ratio range that causes the computing system 200 to remove contours with very small and very large aspect ratios.

Figure 9:
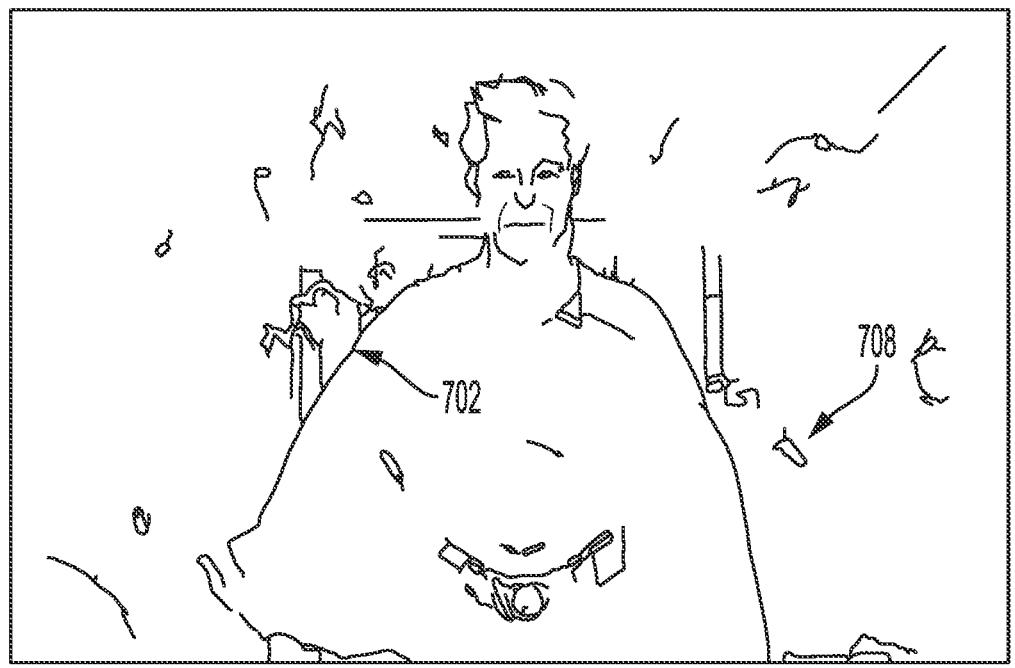
FIG. 9 depicts an example edge image.

FIG. 9 depicts a third edge image 900 that the computing system 200 generates by removing contours from the second edge image 700 using the set of conditions described above. As shown, contour 704 and contour 706 have been removed using the set of conditions, whereas contour 702 and contour 708 remain. In some examples, candidate ROIs can be identified without removing contours using the set of conditions.

Having determined the edge image and removing contours from the edge image using the set of conditions, the computing system 200 can identify the candidate ROI based on the candidate ROI enclosing a portion of the edge image having edge densities that exceed a threshold edge density. That is, the computing system 200 estimates the x- and y-coordinates of the corners of a bounding box that define the boundaries of a portion of the edge image in which the most edge activity is present.

To calculate the x-coordinates of the candidate ROI, for example, the computing system 200 can sum across the width of the edge image. That is, the computing system 200 can sum each column of pixels of the edge image (i.e., the total number of is in each column) to determine a one-dimensional edge density vector having a length equal to the width of the edge image. For example, for an edge image having a width of 500 pixels, the length of the vector will be 500.

The computing system 200 can then calculate a running sum along the edge density vector from left to right to determine a first cumulative sum vector, as well calculate a running sum along the edge density vector from right to left to determine a second cumulative sum vector. The length of the first and second cumulative sum vectors are each the same as the width of the edge image.

The computing system 200 can then determine (i) a first pixel location at which, when traversing the first cumulative sum vector from left to right, the first cumulative sum vector first exceeds a preselected threshold cumulative edge density and (ii) a second pixel location at which, when traversing the second cumulative sum vector from left to right, the second cumulative sum vector last exceeds the preselected threshold cumulative edge density. The determined first pixel location is the minimum x-coordinate of the ROI, x_min, and the determined second pixel location is the maximum x-coordinate of the ROI, x_max.

As a simplified example, consider an un-normalized edge density vector of [0,0,0,1,2,10,1,0,0,0,1] having a length of 11 corresponding to an edge image having a width of 11 (e.g., from pixel location 0 to pixel location 10). Given this edge density vector, the first cumulative sum vector is [0,0,0,1,3,13,14,14,14,14,15] and the second cumulative sum vector is [15,15,15,15,14,12,2,1,1,1,1]. Further, considering an example preselected threshold cumulative edge density of 1, x_min of the candidate ROI is 4 and x_max of the candidate ROI is 6. Thus, the candidate ROI has a width of 3.

Figure 10:
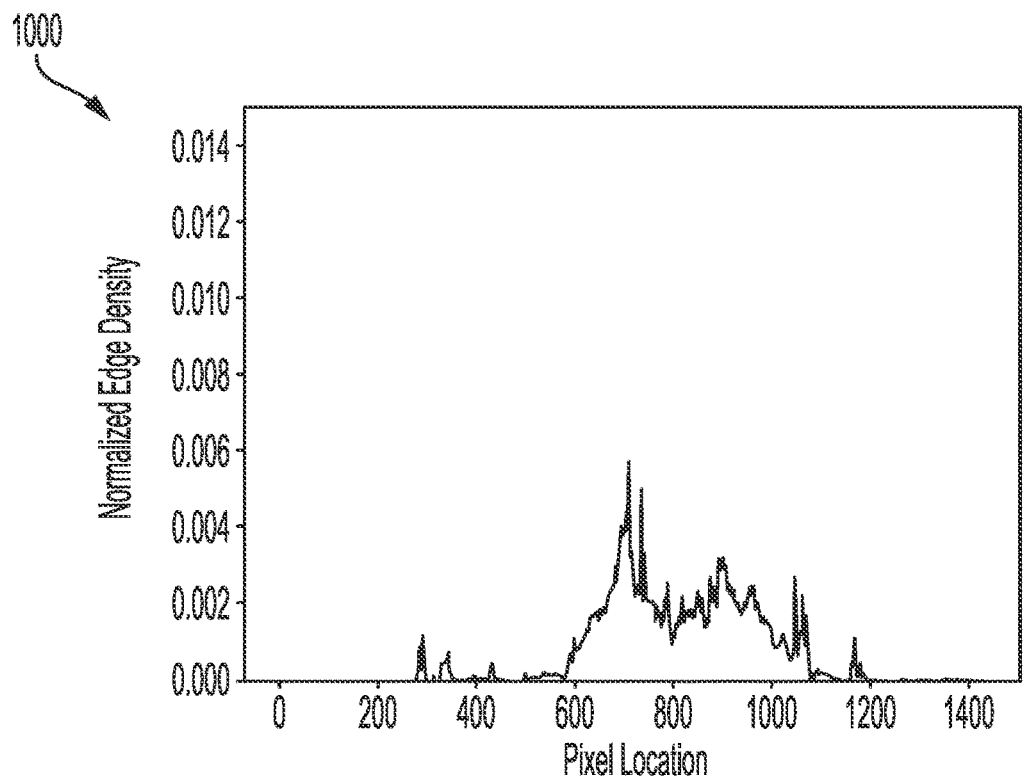
FIG. 10 depicts an example graph of normalized edge densities of an edge image.

As another illustrative example of calculating the x-coordinates of the candidate ROI, FIG. 10 depicts an example graph 1000 of normalized edge density (y-axis) by pixel location (x-axis), where the normalized edge density for a column of pixels is equal to the sum of the is of the column divided by the height of the edge image. As shown, there is a higher normalized edge density towards the middle of the edge image, as the peaks of the graph 1000 correspond to regions of higher edge density.

Figure 11:
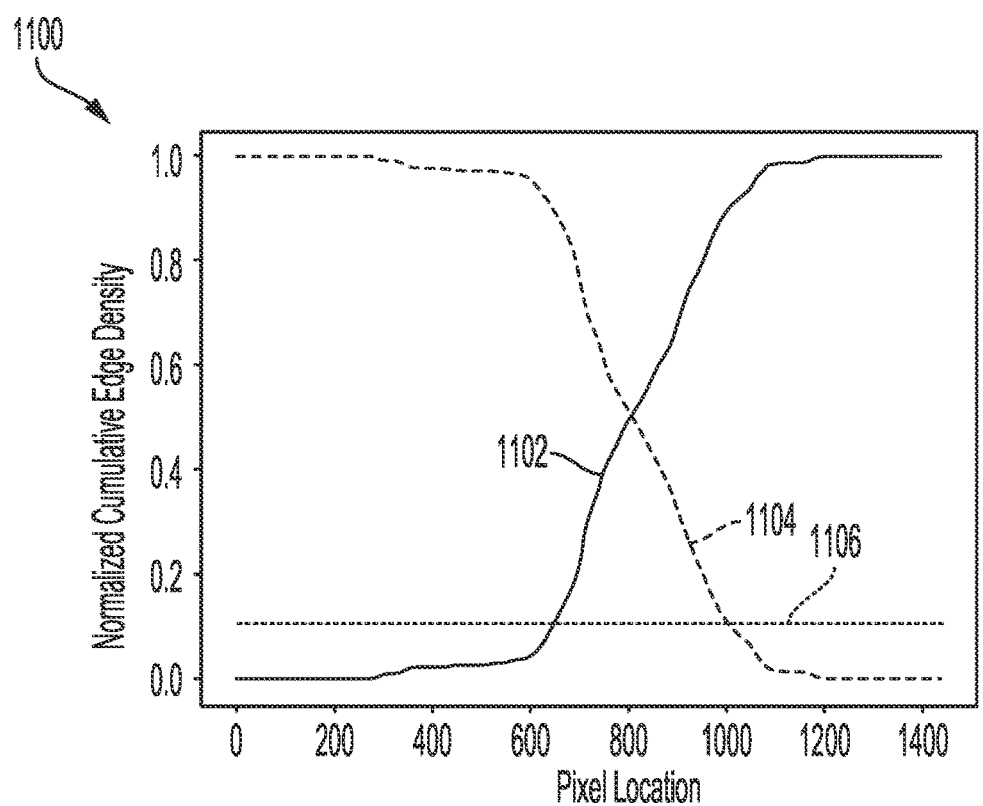
FIG. 11 depicts an example graph of cumulative edge densities of an edge image.

FIG. 11 next depicts another example graph 1100 of normalized cumulative edge density (y-axis) by pixel location (x-axis). As shown, the running sum from left to right (lowest to highest pixel location) is shown by curve 1102, and the running sum from right to left (highest to lowest pixel location) is shown by curve 1104. Also shown is an example preselected threshold cumulative edge density 1106 of 0.1. As such, the computing system 200 can determine the point where curve 1102 first exceeds the preselected threshold cumulative edge density 1106, which is shown as near pixel location of 700, and can also determine the point where curve 1104 last exceeds the preselected threshold cumulative edge density 1106, which is shown as near pixel location of 1050.

The computing system 200 can also perform above-described process to calculate the y-coordinates of the candidate ROI. In particular, the computing system 200 can sum across the height of the edge image. That is, the computing system 200 can sum each row of pixels of the edge image (i.e., the total number of is in each row) to determine a one-dimensional edge density vector having a length equal to the height of the edge image. The computing system 200 can then calculate a running sum along the edge density vector from left to right to determine a first cumulative sum vector, as well calculate a running sum along the edge density vector from right to left to determine a second cumulative sum vector. The length of the first and second cumulative sum vectors are each the same as the height of the edge image. The computing system 200 can then determine (i) a first pixel location at which, when traversing the first cumulative sum vector from left to right, the first cumulative sum vector first exceeds a preselected threshold cumulative edge density (e.g., the same threshold as used when calculating the x-coordinates, or a different preselected threshold) and (ii) a second pixel location at which, when traversing the second cumulative sum vector from left to right, the second cumulative sum vector last exceeds the preselected threshold cumulative edge density. In this case, the determined first pixel location is the minimum y-coordinate of the ROI, y_min, and the determined second pixel location is the maximum y-coordinate of the ROI, y_max.

Figure 12:
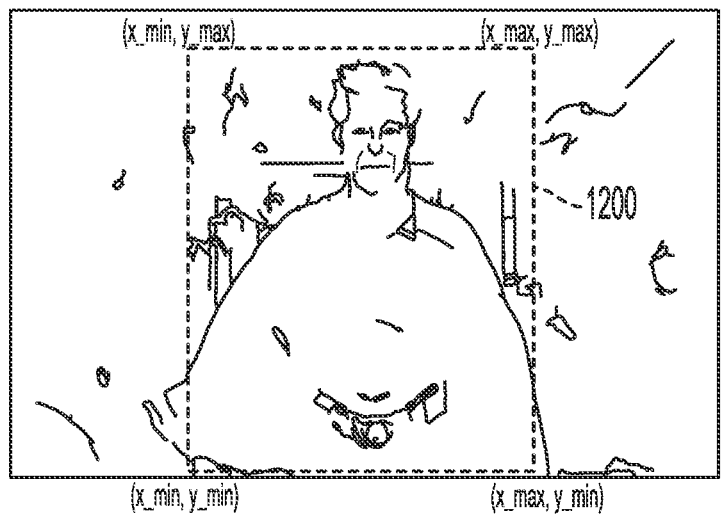
FIG. 12 depicts an example ROI of the edge image of FIG. 9.

FIG. 12 depicts a candidate ROI 1200 identified from the third edge image 900 of FIG. 9. That is, FIG. 12 depicts a representative example of an ROI that can be identified as a result of the computing system 200 performing the pre-smoothing and filtering processes described above. As further shown, the candidate ROI 1200 is similar in size to the candidate ROI 502 shown in FIG. 5 as well. The above-described coordinates for the four corners of the candidate ROI 1200 are shown as well.

Figure 13:
FIG. 13 depicts an example ROI of the edge image of FIG. 7.

By contrast, FIG. 13 depicts a candidate ROI 1300 identified from the second edge image 700 of FIG. 7. That is, FIG. 13 depicts a representative example of an ROI that can be identified as a result of the computing system 200 performing the pre-smoothing, but not the filtering process.

Figure 14:
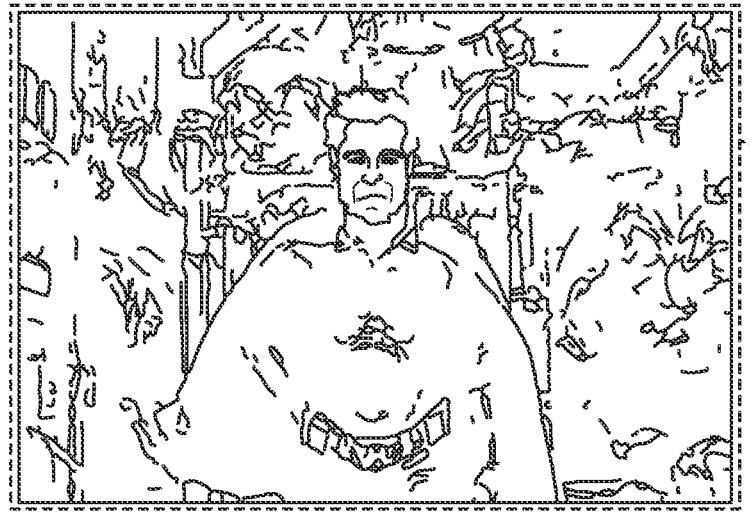
FIG. 14 depicts an example ROI of the edge image of FIG. 6.

Further, by contrast, FIG. 14 depicts a candidate ROI 1400 identified from the first edge image 600 of FIG. 6. That is, FIG. 14 depicts a representative example of an ROI that can be identified as a result of the computing system 200 identifying an ROI without pre-smoothing or filtering.

As shown in FIGS. 12-14, pre-smoothing the raw image and filtering the corresponding edge image can help improve the accuracy with which a desired ROI is identified in the raw image. Without pre-smoothing and filtering, there can be higher edge densities towards the far sides of the raw image and/or in other locations that are not the desired focal point of the raw image.

In some examples, the computing system 200 can use other techniques for identifying additional candidate ROIs, such as a face detection and/or a machine learning process now known or later developed. Using such techniques to determine additional candidate ROIs can usefully provide additional candidate backdrop images, which can be considered and compared with those generated from ROIs identified with edge detection to facilitate a selection of a best possible candidate backdrop image.

An example face detection technique is described in U.S. Pat. No. 11,062,127, issued Jul. 13, 2021, the entirety of which is hereby incorporated by reference herein. Using this example technique the computing system 200 can identify geometric coordinates of at least one person in the raw image and identify a candidate ROI that is defined by those coordinates or includes those coordinates. In some cases, the computing system 200 can determine the candidate ROI to be a region of the raw image that includes multiple detected faces. As a more particular example, the computing system 200 can determine a larger bounding box that is a union of multiple bounding box coordinates for detected faces, such as a union of a plurality of bounding boxes that exceed a particular threshold height and/or width (thus effectively also removing bounding boxes that are below the threshold(s)). Further, the computing system 200 can stretch the larger bounding box in height and/or width by a preselected constant amount. Other examples are possible as well.

An example machine learning technique, as noted above, is described in U.S. patent application Ser. No. 16/749,724, filed Jan. 22, 2020, the entirety of which is hereby incorporated by reference herein. As further noted above, the machine learning predictor program of U.S. patent application Ser. No. 16/749,724 is configured to generate predicted cropping characteristics, such as cropping boundaries, image sizes (e.g., pixel-array size), and/or ROIs, for any given input image, and could be used by the computing system 200 to identify ROI characteristics of a ROI in the raw image based on expected ROI characteristics represented in a set of training raw images.

After identifying the candidate ROI, such as the candidate ROI identified using edge detection as described above, the computing system 200 can manipulate (e.g., shift, crop, and/or scale) the raw image relative to a backdrop imagery canvas for a graphical user interface based on a location of the candidate ROI within the raw image. Based on the manipulating, the computing system 200 can generate a set of one or more candidate backdrop images in which at least a portion of the candidate ROI occupies a preselected area of the backdrop imagery canvas. For instance, the computing system 200 can perform different combinations of shifting, cropping, and/or scaling operations to produce multiple different candidate backdrop images.

The "preselected area" is a portion of the backdrop imagery canvas in which it is desired for at least part of the candidate ROI (e.g., the entirety of the candidate ROI) to be located in a candidate backdrop image. That is, the preselected area is a designated area of pixels of the backdrop imagery canvas in which the computing system 200 places at least a portion of the candidate ROI such that at least the portion of the candidate ROI occupies that area. In some cases, the computing system 200 can be configured not to generate a candidate backdrop image from a candidate ROI unless an entirety of the preselected area is occupied by at least a portion of the raw image, including at least a portion of the candidate ROI.

In some examples, the preselected area can be an area of the backdrop imagery canvas that is to the right of a vertical midline of the backdrop imagery canvas, in which case the computing system 200 would not cause any portion of the candidate ROI to be on the left side of the vertical midline. In other examples, the preselected area can be an area of the backdrop imagery canvas that is to the right of the vertical midline and also above a particular row of pixels. As a more particular example, the preselected area can be an area that is right of the vertical midline and that occupies the top 75% of the height of the backdrop imagery canvas. As another particular example, the preselected area can be an area that is right of the vertical midline of the backdrop imagery canvas and above a horizontal midline of the backdrop imagery canvas. Other examples are possible as well.

In some examples, the act of manipulating the raw image can involve the computing system 200 manipulating the raw image in such a way that results in no gaps between at least one edge location of the raw image and at least one corresponding edge location of the backdrop imagery canvas. For example, the computing system 200 can manipulate the raw image so that there is no offset/gap between a top edge location of the backdrop imagery canvas and a top edge location of the raw image and further such that there is no offset/gap between a right edge location of the backdrop imagery canvas and a right edge location of the raw image.

Figure 15:
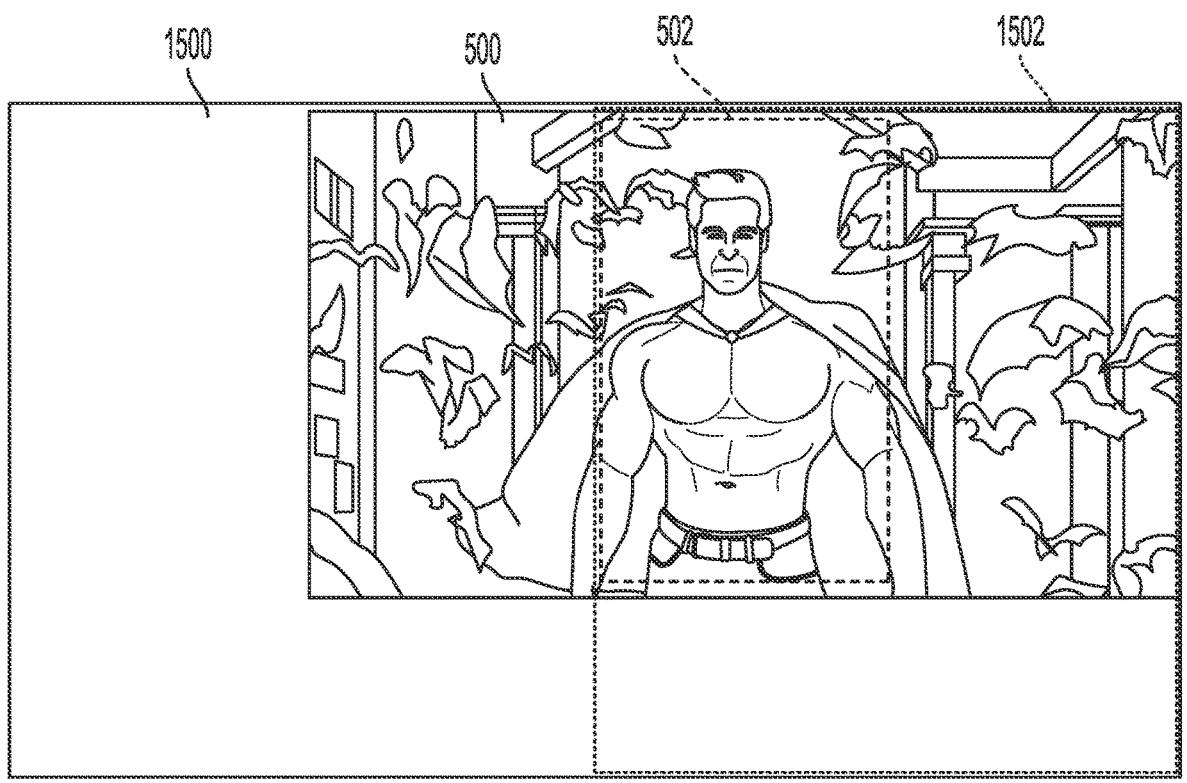
FIG. 15 depicts an example backdrop imagery canvas relative to which the raw image of FIG. 5 has been manipulated.

FIG. 15 depicts an example backdrop imagery canvas 1500, relative to which the raw image 500 of FIG. 5 has been manipulated to locate the candidate ROI 502 within an example preselected area 1502 of the backdrop imagery canvas 1500 and in the top right corner of the backdrop imagery canvas 1500 such that there are no gaps between the raw image and the top and right edge locations of the backdrop imagery canvas 1500.

Example techniques for manipulating the raw image will now be described. In some implementations, the computing system 200 can manipulate the raw image relative to the backdrop imagery canvas based on a left edge location (x_min) of the candidate ROI within the raw image and/or based on a right edge location (x_max) of the candidate ROI within the raw image. As an example, the computing system 200 can shift and/or scale the raw image to align the left edge location with the vertical midline of the backdrop imagery canvas.

In other examples, the computing system 200 can shift and scale the raw image to not only align the left edge location with the vertical midline, but also to align the right edge location with a right edge location of the backdrop imagery canvas (i.e., the far right edge of the backdrop imagery canvas). For example, the computing system 200 can first shift the raw image until the right edge location of the candidate ROI is aligned with the right edge location of the backdrop imagery canvas. The amount of pixels by which the computing system 200 shifts the raw image to the right in order to align the right edge location of the candidate ROI with the right edge location of the backdrop imagery canvas is referred to herein as right_shift. After the raw image has been shifted, if the computing system 200 determines that the left edge location of the candidate ROI is not aligned with the vertical midline, the computing system 200 can scale the raw image, keeping the right edge locations aligned, until the left edge location of the candidate ROI is aligned with the vertical midline.

In situations where the raw image is scaled and shifted, the computing system 200 can remove portions of the raw image that do not fit on the backdrop imagery canvas.

Figure 16:
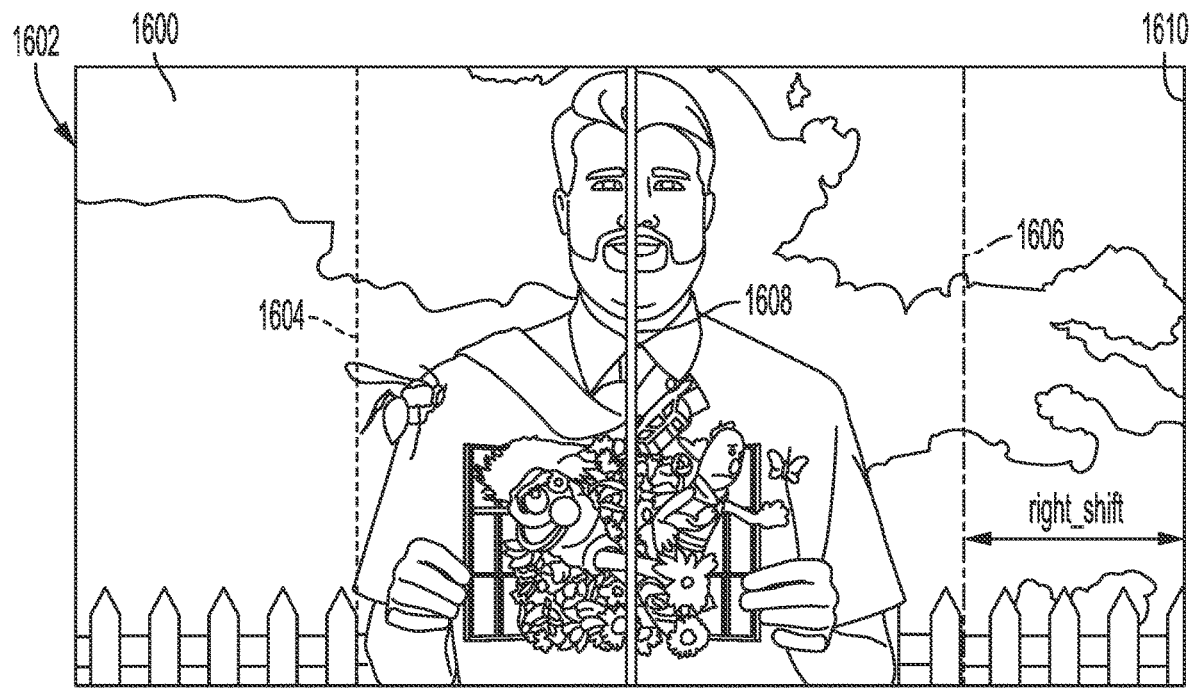
FIG. 16 depicts an example raw image before manipulation relative to a backdrop imagery canvas.
Figure 17:
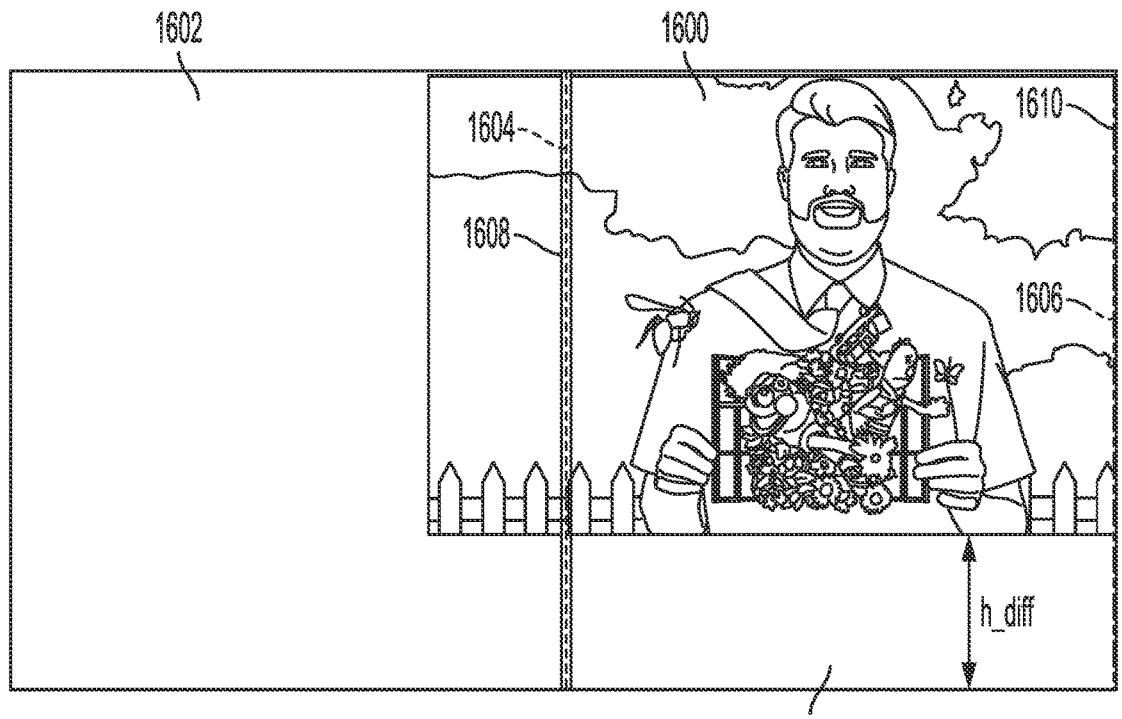
FIG. 17 depicts an example raw image after manipulation relative to a backdrop imagery canvas.

FIGS. 16 and 17 depict example steps in a process for manipulating a raw image.

FIG. 16 depicts an example raw image 1600 before the computing system 200 manipulates the raw image 1600. As shown, the raw image 1600 is the same size as the backdrop imagery canvas 1602 (and thus, the backdrop imagery canvas is not explicitly shown). Also shown in FIG. 16 is a left edge location 1604 of the candidate ROI, a right edge location 1606 of the candidate ROI, and a midline 1608 of the backdrop imagery canvas 1602. FIG. 16 also shows right_shift, the amount of pixels by which the raw image 1600 can be shifted to align the right edge location 1606 of the candidate ROI with a right edge location 1610 of the backdrop imagery canvas. The full bounding box, including y_min and y_max, of the candidate ROI is not explicitly shown in FIG. 16. In some cases, the candidate ROI can have a height equal to the height of the raw image.

FIG. 17 depicts the raw image 1600 after the computing system 200 has shifted the raw image 1600 right and scaled the raw image 1600 down to align the left edge location 1604 with the midline 1608 of the backdrop imagery canvas 1602, as well as to align the right edge location 1606 with the right edge location 1610 of the backdrop imagery canvas 1602.

In some implementations, the computing system 200 can manipulate the raw image relative to the backdrop imagery canvas based on the left edge location and/or the right edge location of the candidate ROI within the raw image by shifting the raw image without also scaling the raw image. This technique can also be referred to as "force right shifting" and can be used in situations where it is desirable to have the focal point of the backdrop image be on the right side of the backdrop image. In addition, force right shifting can be desirable in situations where the ROI identification process results in a defective or otherwise undesirable ROI and/or where it is visually unappealing to have a black bar between the raw image and the backdrop imagery canvas after the raw image has been scaled.

In some examples of force right shifting, the computing system 200 can shift the raw image to the right until the left edge location is aligned with the vertical midline of the backdrop imagery canvas and remove any portion of the raw image that does not fit on the backdrop imagery canvas. The amount of pixels by which the raw image is shifted right is the amount of pixels right that the raw image should be shifted in order to align the left edge location with the vertical midline of the backdrop imagery canvas.

In other examples of force right shifting, the computing system 200 can determine the pixel height of the black bar that would have resulted if the computing system 200 had scaled the raw image, h_diff. To illustrate this, FIG. 17 also shows an example of a black bar 1700 having a pixel height of h_diff, which can result from scaling the raw image.

Having determined h_diff, the computing system 200 can then shift the raw image by a total distance of h_diff plus right_shift, which is the amount of pixels that the computing system 200 can shift the raw image to the right in order to align the right edge location of the candidate ROI with the right edge location of the backdrop imagery canvas as described above. The computing system 200 can then remove any portion of the raw image that does not fit on the backdrop imagery canvas.

Figure 18:
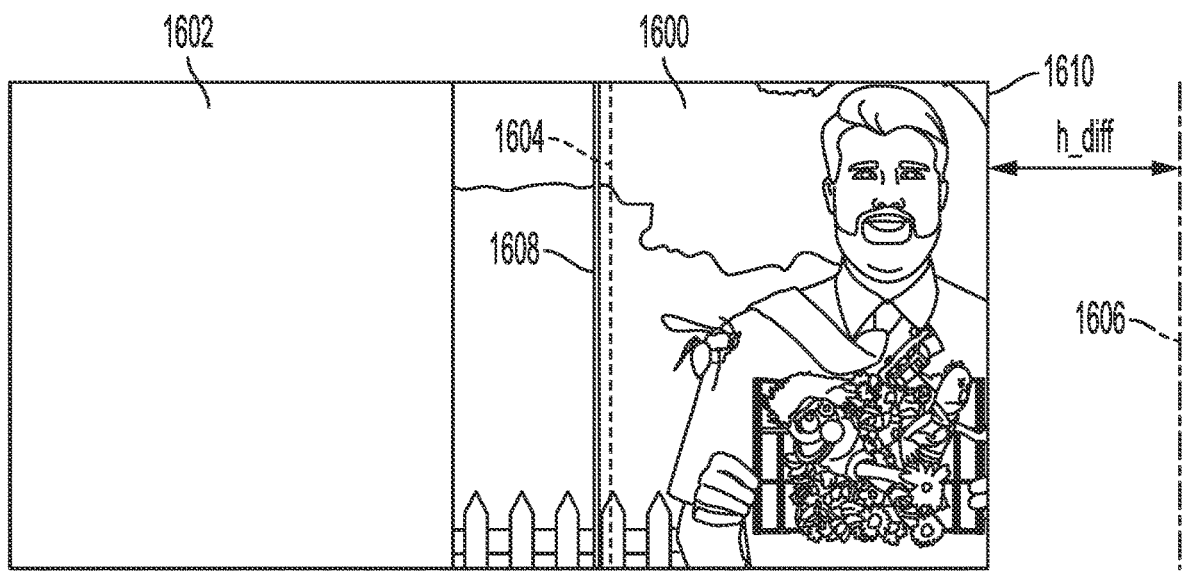
FIG. 18 depicts an example raw image after manipulation relative to a backdrop imagery canvas.

To illustrate this, FIG. 18 depicts the raw image 1600 of FIGS. 16 and 17 after it has been force right shifted by right_shift and h_diff and the remaining portion of the raw image 1600 that did not fit beyond the right edge location 1610 of the backdrop imagery canvas 1602 was removed.

By shifting the raw image without scaling it, higher quality backdrop images can be produced in some situation, as shifting-without-scaling does not shrink a raw image down or introduce black bars on the bottom of the raw image. An example of such a situation is when the identified candidate ROI is not as accurate as others, which can be due to the raw image having numerous edges and many regions with high edge density. In some cases, the computing system 200 can generate a first candidate backdrop image from the candidate ROI using the shifting and scaling technique described above and can also generate a second candidate backdrop image from the candidate ROI using force right shifting.

Additionally or alternatively to force right shifting the raw image, the computing system 200 can crop the raw image, and can do so as an alternative to scaling in some cases. For instance, the computing system 200 can crop out at least a portion of the raw image other than the candidate ROI, such as at least a portion of the raw image that is above the top edge of the candidate ROI or below the bottom edge of the candidate ROI. Further, if the resulting raw image is smaller than a predefined size, the computing system 200 can then stretch the raw image. As such, the raw image can be cropped along the y-axis to retain the candidate ROI without scaling the raw image to fit into the preselected area.

In scaling, shifting, and/or cropping situations where the manipulation of the raw image would cause a face detected in the raw image to be cropped, the computing system 200 can adjust the manner in which the raw image is manipulated so as to include the entirety of the region of the raw image contained by the bounding box that encloses the face.

In some cases, the raw image can be taller than the backdrop imagery canvas. In such situations, the computing system 200 can pre-scale or crop the raw image before performing any other manipulations described above. For example, if the raw image is 1920×1180 and the backdrop imagery canvas is 1920×1080, the computing system 200 can shrink the raw image uniformly by a factor of 1180/1080 to make the raw image fit into the height of the backdrop imagery canvas. As another example, given the previously-noted raw image and backdrop imagery canvas size, the computing system 200 can crop the extra 100 pixels out of the raw image from a top and/or bottom of the raw image, depending on where the candidate ROI is located (e.g., if the bottom edge of the candidate ROI is the bottom of the raw image, then crop the 100 pixels from the top of the raw image). Other examples are possible as well.

As noted above, in some cases, if the raw image meets certain conditions, the computing system 200 will not perform any manipulation of the raw image. For example, responsive to the computing system 200 determining that (i) the raw image and the backdrop imagery canvas have the same aspect ratio and that (ii) the candidate ROI is already located in the preselected area of the backdrop imagery canvas, the computing system 200 will not manipulate the raw image and will use the raw image as a candidate backdrop image. Further, in some cases, the computing system 200 can perform a pre-scaling option before any other manipulation (if any) occurs. For instance, if the raw image is 1200×1200 and the backdrop imagery canvas is 1000×1000, the computing system 200 can shrink the raw image to fit the backdrop imagery canvas and then determine whether, as a result of the shrinking, the candidate ROI is already located in the preselected area of the backdrop imagery canvas. If so, the computing system 200 will not manipulate the raw image and will use the scaled-down raw image as a candidate backdrop image.

Having generated the set of candidate backdrop images, the computing system 200 can store the set of candidate backdrop images in non-transitory computer-readable memory (e.g., database 208 or data storage unit 104). Further, once a candidate backdrop image is generated, the computing system 200 can perform various actions, such as display the candidate backdrop image on a display device (e.g., a computer screen) or transmit the candidate backdrop image to another computing system, such as a client device (e.g., a smartphone, laptop computer, etc.). In some cases, the computing system 200 can generate a candidate GUI that includes the candidate backdrop image and additional graphical elements such as text describing the media content to which the candidate backdrop image relates.

In some cases, a portion of the backdrop imagery canvas is left blank as a result of the candidate ROI occupying the preselected area of the backdrop imagery canvas, in which case the computing system 200 can fill the blank portion of the backdrop imagery canvas.

As an example, the computing system 200 can consider multiple different regions of the raw image and sample the dominant color from those regions. The computing system 200 can then fill in the blank portion of the backdrop imagery canvas with the dominant color. As another example, the computing system 200 can reflect, stretch, and/or blur a right portion of the raw image to fill the blank portion of the backdrop imagery canvas. Other examples are possible as well.

In some cases, using one or more of the ROI identification techniques described above, the computing system 200 can identify multiple candidate ROIs, such as one or more different candidate ROIs for each technique, and can manipulate each candidate ROI in one or more different ways to generate, using each candidate ROI, a corresponding set of one or more backdrop images. As an example, the computing system 200 can identify multiple candidate ROIs using multiple edge detection techniques, such as one or more candidate ROIs for each edge technique. As such, the computing system 200 can determine a backdrop images for each candidate ROI, or can first filter the candidate ROIs to remove duplicates or near-duplicates having a threshold similarity (e.g., having a width and height within a threshold amount of pixels of each other). As another example, the computing system 200 can identify a first candidate ROI using an edge detection technique and a second candidate ROI using a face detection technique, and can then generate multiple candidate backdrop images for each candidate ROI.

B. Example Method

Figure 19:
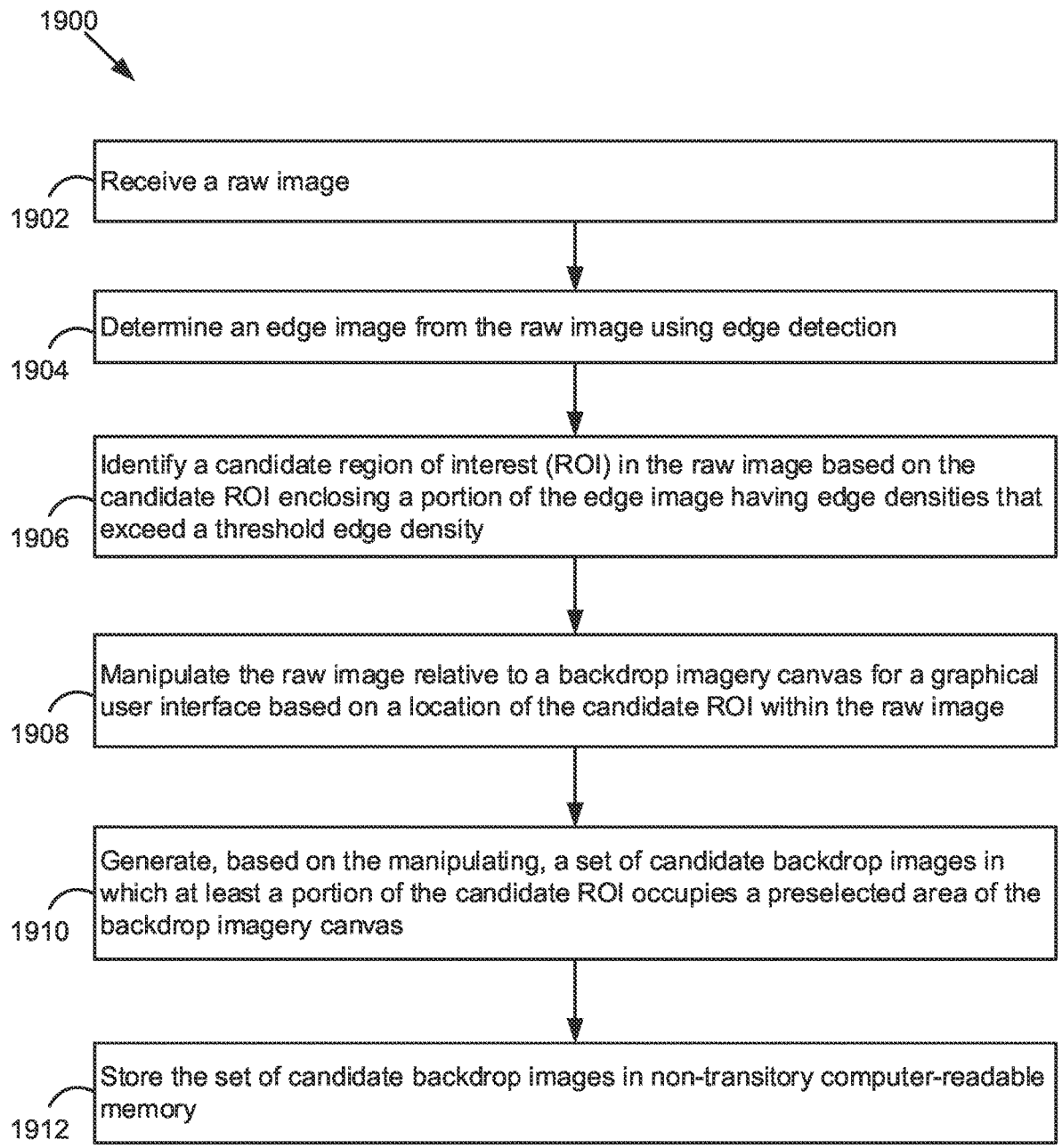
FIG. 19 is a flow chart of an example method.

FIG. 19 is a flow chart of an example method 1900. Method 1900 can be carried out by a computing system, such as computing system 200 of FIG. 2.

At block 1902, the method 1900 includes receiving, by a computing system, a raw image. At block 1904, the method 1900 includes determining, by the computing system, an edge image from the raw image using edge detection. At block 1906, the method 1900 includes identifying, by the computing system, a candidate region of interest (ROI) in the raw image based on the candidate ROI enclosing a portion of the edge image having edge densities that exceed a threshold edge density. At block 1908, the method 1900 includes manipulating, by the computing system, the raw image relative to a backdrop imagery canvas for a graphical user interface based on a location of the candidate ROI within the raw image. At block 1910, the method 1900 includes generating, by the computing system and based on the manipulating, a set of candidate backdrop images in which at least a portion of the candidate ROI occupies a preselected area of the backdrop imagery canvas. At block 1912, the method 1900 includes storing, by the computing system, in non-transitory computer-readable memory, the set of candidate backdrop images.

In some examples, the method 1900 can also include before determining the edge image and identifying the candidate ROI, pre-smoothing, by the computing system, the raw image, and after determining the edge image and before identifying the candidate ROI, removing, by the computing system, from the edge image, contours that satisfy a set of conditions, where each contour comprises a plurality of connected pixels that each have a binary value of 1. Further, in some examples, the set of conditions can include a first condition that a contour comprises a straight line of pixels that is below a threshold length of pixels, a second condition that a contour comprises an area that is below a threshold area, and a third condition that a contour comprises a perimeter that is below a threshold perimeter.

In additional examples, the act of manipulating the raw image relative to the backdrop imagery canvas based on the location of the candidate ROI within the raw image can involve manipulating the raw image relative to the backdrop imagery canvas based on one or more of a left edge location of the candidate ROI within the raw image or a right edge location of the candidate ROI within the raw image. Further, in additional examples, the act of manipulating the raw image relative to the backdrop imagery canvas based on one or more of the left edge location of the candidate ROI within the raw image or the right edge location of the candidate ROI within the raw image can involve shifting and scaling the raw image to align the left edge location with a vertical midline of the backdrop imagery canvas or can involve shifting the raw image without scaling the raw image.

In additional examples, the method 1900 can also include identifying, by the computing system, a location of at least one face in the raw image; identifying, by the computing system, a second candidate ROI in the raw image based on the location of the at least one face in the raw image; manipulating, by the computing system, the raw image relative to the backdrop imagery canvas based on a location of the second candidate ROI within the raw image and further based on a vertical midline of the backdrop imagery canvas; generating, by the computing system and based on the manipulating, a second set of candidate backdrop images in which at least a portion of the second candidate ROI occupies a preselected area of the backdrop imagery canvas; and storing, by the computing system, in non-transitory computer-readable memory, the second set of candidate backdrop images.

In additional examples, the method 1900 can also include using, by the computing system, a machine learning ROI program implemented on the computing system to identify a second candidate ROI in the raw image, where the machine learning ROI program is configured to predict ROI characteristics for the raw image based on expected ROI characteristics represented in a set of training raw images; manipulating, by the computing system, the raw image relative to the backdrop imagery canvas based on a location of the second candidate ROI within the raw image and further based on a vertical midline of the backdrop imagery canvas; generating, by the computing system and based on the manipulating, a second set of candidate backdrop images in which at least a portion of the second candidate ROI occupies a preselected area of the backdrop imagery canvas; and storing, by the computing system, in non-transitory computer-readable memory, the second set of candidate backdrop images.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for generating a candidate image for use as backdrop imagery for a graphical user interface, the method comprising:
   receiving, by a computing system, a raw image;
   identifying, by the computing system, a location of at least one face in the raw image;
   identifying, by the computing system, a candidate region of interest (ROI) in the raw image based on the location of the at least one face in the raw image;
   manipulating, by the computing system, the raw image relative to a backdrop imagery canvas for a graphical user interface based on a location of the candidate ROI within the raw image;
   generating, by the computing system and based on the manipulating, a set of candidate backdrop images in which at least a portion of the candidate ROI occupies a preselected area of the backdrop imagery canvas; and
   storing, by the computing system, in non-transitory computer-readable memory, the set of candidate backdrop images.

2. The method of claim 1, wherein identifying, by the computing system, the location of the at least one face in the raw image comprises:
   applying a machine learning predictor program to the raw image to recognize the at least one face; and
   determining coordinates in the raw image of a bounding box that includes the at least one face.

3. The method of claim 2, wherein the at least one face is two or more faces,
   and wherein determining the coordinates in the raw image of the bounding box that includes the at least one face comprises:
   determining respective bounding boxes for the two or more faces; and
   determining the bounding box as a union of the respective bounding boxes.

4. The method of claim 1, wherein manipulating the raw image relative to the backdrop imagery canvas based on the location of the candidate ROI within the raw image further comprises manipulating the raw image relative to the backdrop imagery canvas further based on a vertical midline of the backdrop imagery canvas.

5. The method of claim 4, wherein manipulating the raw image relative to the backdrop imagery canvas based on the location of the candidate ROI within the raw image further comprises scaling the raw image.

6. The method of claim 4, wherein manipulating the raw image relative to the backdrop imagery canvas based on the location of the candidate ROI within the raw image further comprises cropping the raw image.

7. The method of claim 1, wherein manipulating the raw image relative to the backdrop imagery canvas based on the location of the candidate ROI within the raw image comprises performing a manipulation action to cause the at least a portion of the candidate ROI to occupy the preselected area of the backdrop imagery canvas,
   wherein the manipulation action is at least one of shifting the raw image, cropping the raw image, or scaling the raw image.

8. A method for generating a candidate image for use as backdrop imagery for a graphical user interface, the method comprising:
   receiving, by a computing system, a raw image;
   using, by the computing system, a machine learning region of interest (ROI) program to identify a candidate ROI in the raw image, wherein the machine learning ROI program is configured to predict ROI characteristics for the raw image based on expected ROI characteristics represented in a set of training raw images;
   manipulating, by the computing system, the raw image relative to a backdrop imagery canvas based on a location of the candidate ROI within the raw image;
   generating, by the computing system and based on the manipulating, a set of candidate backdrop images in which at least a portion of the candidate ROI occupies a preselected area of the backdrop imagery canvas; and
   storing, by the computing system, in non-transitory computer-readable memory, the set of candidate backdrop images.

9. The method of claim 8, wherein the ROI characteristics for the raw image comprise cropping characteristics, wherein cropping characteristics are at least one of cropping boundaries, or image size.

10. The method of claim 8, wherein manipulating the raw image relative to the backdrop imagery canvas based on the location of the candidate ROI within the raw image further comprises manipulating the raw image relative to the backdrop imagery canvas further based on a vertical midline of the backdrop imagery canvas.

11. The method of claim 10, wherein manipulating the raw image relative to the backdrop imagery canvas based on the location of the candidate ROI within the raw image further comprises scaling the raw image.

12. The method of claim 10, wherein manipulating the raw image relative to the backdrop imagery canvas based on the location of the candidate ROI within the raw image further comprises cropping the raw image.

13. The method of claim 8, wherein manipulating the raw image relative to the backdrop imagery canvas based on the location of the candidate ROI within the raw image comprises performing a manipulation action to cause the at least a portion of the candidate ROI to occupy the preselected area of the backdrop imagery canvas,
   wherein the manipulation action is at least one of shifting the raw image, cropping the raw image, or scaling the raw image.

14. A computing system comprising:
   a processor; and
   a non-transitory computer-readable storage medium, having stored thereon program instructions that, upon execution by the processor, cause the computing system to perform a set of operations comprising:
   receiving a raw image;
   identifying a location of at least one face in the raw image;
   identifying a candidate region of interest (ROI) in the raw image based on the location of the at least one face in the raw image;
   manipulating the raw image relative to a backdrop imagery canvas for a graphical user interface based on a location of the candidate ROI within the raw image;
   generating, based on the manipulating, a set of candidate backdrop images in which at least a portion of the candidate ROI occupies a preselected area of the backdrop imagery canvas; and
   storing in non-transitory computer-readable memory, the set of candidate backdrop images.

15. The computing system of claim 14, wherein identifying the location of the at least one face in the raw image comprises:
   applying a machine learning predictor program to the raw image to recognize the at least one face; and
   determining coordinates in the raw image of a bounding box that includes the at least one face.

16. The computing system of claim 15, wherein the at least one face is two or more faces,
and wherein determining the coordinates in the raw image of the bounding box that includes the at least one face comprises:
determining respective bounding boxes for the two or more faces; and
determining the bounding box as a union of the respective bounding boxes.

17. The computing system of claim 14, wherein manipulating the raw image relative to the backdrop imagery canvas based on the location of the candidate ROI within the raw image further comprises manipulating the raw image relative to the backdrop imagery canvas further based on a vertical midline of the backdrop imagery canvas.

18. The computing system of claim 17, wherein manipulating the raw image relative to the backdrop imagery canvas based on the location of the candidate ROI within the raw image further comprises scaling the raw image.

19. The computing system of claim 17, wherein manipulating the raw image relative to the backdrop imagery canvas based on the location of the candidate ROI within the raw image further comprises cropping the raw image.

20. The computing system of claim 14, wherein manipulating the raw image relative to the backdrop imagery canvas based on the location of the candidate ROI within the raw image comprises performing a manipulation action to cause the at least a portion of the candidate ROI to occupy the preselected area of the backdrop imagery canvas,
wherein the manipulation action is at least one of shifting the raw image, cropping the raw image, or scaling the raw image.

\* \* \* \* \*